United States Patent Office 3,525,738
Patented Aug. 25, 1970

3,525,738
PIPERAZINE ESTRONE SULFATE PROCESS
Charles George Lex, Kenosha, Wis., assignor to Abbott Laboratories, Chicago, Ill., a corporation of Illinois
No Drawing. Filed Mar. 24, 1969, Ser. No. 809,963
Int. Cl. C07c *173/00*
U.S. Cl. 260—239.5                                7 Claims

ABSTRACT OF THE DISCLOSURE

Piperazine estrone sulfate is made from estrone by a fast, complete conversion reaction using dimethylformamide/sulfur trioxide complex as the sulfating reactant and dimethylformamide as the solvent, followed by the addition of piperazine.

---

Piperazine estrone sulfate, a widely used hormone preparation, has been known for many years but has always been prepared by conversion methods which produce an end-product of insufficient purity for direct pharmaceutical use; rather complicated and involved purification steps were required to separate the pure product from the undesired by-products and to eliminate discoloration in the product.

Discoloration and by-product formation has been traced to the sulfation step required in the standard method for making piperazine estrone sulfate. This method involved heating estrone in an appropriate solvent with a sulfating agent. Among these sulfating agents, sulfur trioxide, sulfur trioxide/pyridine complex, sulfamic acid and the like have been employed; in all instances, short or prolonged periods of heating were required to produce satisfactory yields and assurance that all of the steroidal starting material was utilized. During this heating, side reactions may occur and the formation of color appeared to be unavoidable.

It is, therefore, an object of the present invention to provide a process for the manufacture of piperazine estrone sulfate producing the latter at substantially quanititative yield without the use of excessive heat; it is another object of this invention to produce piperazine estrone sulfate in a short reaction sequence directly producing the latter without isolation of intermediates; it is a further object of this invention to provide a method for the preparation of piperazine estrone sulfate resulting in execllent quality material of high purity and without discoloration.

These and other objects are accomplished by the process of reacting the sulfur trioxide/dimethylformamide complex with estrone in the presence of excess dry dimethylformamide at a temperature below 40° C. in the absence of water, followed by the addition of piperazine, said dimethylformamide/sulfur trioxide complex being employed in substantially equimolar or slightly greater amount to the amount of estrone starting material and said piperazine being used in an amount of from 2 to 20% above said equimolar amount.

The reaction between sulfur trioxide-dimethylformamide complex and estrone is almost instantaneous at temperatures between −30° and +40° C. so that no heating is required. Thus, almost immediately following the addition of the estrone to the dimethylformamide containing said complex, piperazine can be added within the same temperature range. Since the sulfation reaction is slightly exothermic, cooling of the reaction vessel may be required or desirable. This, however, can be minimized by using a sufficient amount of excess dimethylformamide as the reaction medium. The presence of water or moisture in the reaction vessel must be avoided to assure complete conversion to the desired piperazine estrone sulfate and to avoid by-product formation.

Usually, the concentration of reactants in the reaction medium is between 0.1 and 2 moles per liter. Since the formed piperazine estrone sulfate is soluble in dimethylformamide and piperazine sulfate is insoluble, simple filtration eliminates the latter which forms when excess sulfur trioxide complex and excess piperazine are used. Dilution of the dimethylformamide filtrate with ether precipitates the desired piperazine estrone sulfate in excellent yield and outstanding quality.

In order to illustrate the above process, reference is made to the following examples which, however, are not meant to restrict the invention in any respect.

EXAMPLES 1–7

Dimethylformamide was dried by atmospheric distillation at 152–153° C. to analyze less than 0.1% water. To one liter of dry dimethylformamide under nitrogen purge in a round-bottom flask fitted with a mechanical stirrer, thermometer and addition funnel was added 50 ml. (93 g.) liquid sulfur trioxide under stirring and suitable cooling means. Fuming was minimal due to the virtual absence of water. After the addition was complete, the reaction mixture was stirred until the temperature reached +10° C. at which temperature the complex formed was stable for 2–3 months (but eventually darkens from a light yellow to an orange discoloration).

To a solution prepared in this manner, a specified amount of estrone was added all at once. It dissolved within two minutes and no additional color formed during one hour of stirring subsequently, excess piperazine was added to the stirred solution without external heating or cooling which raised the temperature from the initial 25° to 40–45° C. Some piperazine sulfate precipitated. The solution was stirred 10–30 minutes and additional dimethylformamide, ether or methanol was added as noted in the table below. The solution was then filtered with or without the use of a filter aid. Results obtained in either case were almost identical, but faster filtration resulted when a filter aid was used. The filter cake was routinely washed with about 10% by volume of dimethylformamide. At this point, methanol up to 20% of the total volume may be added.

To the combined filtrate and wash liquor, ether was added dropwise under stirring in a volume of 1.5–2.5 times that of the combined solutions. The desired piperazine estrone sulfate started to crystallize or precipitate after about one quarter of the ether volume had been added. The product was collected on a filter, washed with ether/methanol 5:1–10:1 and dried for two hours at 60° C. in a vacuum oven.

| Ex. No. | Mole Ratio, E:SO$_3$:Pip | DMF, ml. | Time, min. | Max. temp. | Work-up, time/temp. | Ether, ml. | Yield, percent | Purity, percent |
|---|---|---|---|---|---|---|---|---|
| 1 | 0.08:0.114:0.2  | 100   | 60   | 43° | 30′/25° | 2:1   | 95  | 95 7 |
| 2 | 0.06:0.828:0.15 | 50    | 70   | 43° | 10′/70° | 2:1   | 99  | 88.5 |
| 3 | 0.06:0.828:0.1  | 50+25 | 15   | 43° | 30′/30° | 2:1   | 100 | 92.5 |
| 4 | 0.06:0.865:0.12 | 50+35 | 15   | 25° | 10′/4°  | 1.5:1 | 92  | 93.8 |
| 5 | 0.06:0.09:0.12  | 75    | [1] 15 | 25° | 15′/4°  | 1.5:1 | 93  | 94.3 |
| 6 | 0.07:0.09:0.12  | 75    | [2] 60 | 40° | 20′/25° | 1.5:1 | 91  | 99.7 |
| 7 | 0.07:0.09:0.12  | 75    | [3] 60 | 40° | 20′/25° | 1.5:1 | 94  | 91.8 |

[1] +35 ml. of methanol.   [2] +4.5 ml. of ether.   [3] +7.5 ml. of ether.

The above table shows various runs with all necessary details noted. The yields and purities indicated are those of the crude products obtained, i.e., without further recrystallization.

In the table, the column headed by "mole ratio" reflects the ratio used between estrone (E), sulfur trioxide and piperazine (Pip). The following column indicates the amount of dimethylformamide (DMF); in runs 3 and 5 the second figure indicates the amount of additional dimethylformamide which was added prior to the addition of piperazine. The column headed by "ether" shows the ratio of ether: dimethylformamide volumes. The footnotes indicated in the "time" column refer to the addition of various solvents prior to the filtration of the end product.

If desired, the product obtained can be recrystallized by the following method: the product is refluxed for 15 minutes in 6 ml. of a solvent mixture per gram of product, said mixture consisting of methanol containing 10% piperazine and 1–2% of water. The solution is filtered hot and the filtrate is concentrated to a volume of 4–5 ml. per gram of piperazine estrone sulfate. Upon cooling to 10° C., analytically pure material crystallizes which is filtered, washed and dried as above.

EXAMPLE 8

In a further modification of the above procedure, the product solution obtained after addition of the piperazine was not filtered but directly diluted with two volumes of ether. The formed precipitate analyzed to contain 96.8% by weight of piperazine estrone sulfate and 1.02% of free estrone. Upon following the above recrystallization procedure, piperazine estrone sulfate was obtained at 98.9% purity with 1.07% of estrone present; the melting point was 192–5° C. and the yield of piperazine estrone sulfate was 91.5% of theory. The mother liquor was used in subsequent batches for the recrystallization step to minimize loss of starting material and to approach theoretical yield of the desired end product in pure form.

The above examples demonstrate the excellent yield and exceptional purity of the crude material obtained by the present invention. The reaction according to this invention is extremely fast; it is 98%–100% complete within five minutes of the addition of the piperazine and equally fast in the preceding sulfation step. Consequently, the new process is easily adaptable to a continuous operation.

Among the other advantages of the present process are the following: no heat or heating is required, no color formation takes place, the reaction is almost instantaneous and only small volumes are required for relatively large batch sizes which previously necessitated much larger equipment; due to the almost complete absence of by-products, the work-up of a reaction batch is extremely simple and fast and reduces the purification time required by older processes to about 20% of that time. In addition, sulfur trioxide is the most economical sulfating agent and the dimethylformamide used is easily recoverable and reusable, while the sulfamic acid and/or the pyridine used in older processes are more costly and/or more difficult to recover.

I claim:

1. The process of preparing piperazine estrone sulfate consisting essentially in contacting sulfur trioxide/dimethylformamide complex with estrone in dimethylformamide as the contacting medium and in the absence of water, at a temperature below 40° C., and adding piperazine to said mixture.

2. The process of claim 1 wherein said complex is used in an amount equimolar or slightly in excess of the amount of said estrone.

3. The process of claim 1 wherein said piperazine is used in an amount exceeding the equimolar amount of said estrone by 2–20% by weight.

4. The process of claim 1 wherein said complex is dissolved in dimethylformamide in a concentration of between 0.1 and 2.0 moles per liter.

5. The process of claim 1 wherein the piperazine estrone sulfate is subsequently precipitated from the solution in said medium by the addition of ether.

6. The process of claim 5 wherein the solution is filtered prior to said precipitation with ether.

7. The process of claim 5 wherein said ether is added in a volume of at least twice the volume of said solution.

References Cited

UNITED STATES PATENTS 2,650,918    9/1953    Beall et al. _____ 260—239.5

LEWIS GOTTS, Primary Examiner

E. G. LOVE, Assistant Examiner